MAGNETIC MEMORY EMPLOYING TWO THIN FILMS

Filed June 30, 1965

INVENTORS
RALPH F. PENOYER
OTTO VOEGELI
BY
John E. Dougherty Jr
ATTORNEY

United States Patent Office 3,440,626
Patented Apr. 22, 1969

3,440,626

MAGNETIC MEMORY EMPLOYING TWO THIN FILMS

Ralph F. Penoyer, Poughkeepsie, N.Y., and Otto Voegeli, West Lafayette, Ind., assignors to International Business Machines Corporation, Armonk, N.Y., a corporation of New York Filed June 30, 1965, Ser. No. 468,314
Int. Cl. G11b 5/00
U.S. Cl. 340—174 4 Claims

ABSTRACT OF THE DISCLOSURE

The magnetic thin film storage element includes two thin films having uniaxial anisotopy mounted one above the other with their easy axes parallel. When storing binary information the films are magnetized along their easy axis in opposite directions. One film has a higher uniaxial anisotropy field than the other and the films are tightly coupled so that their fields interact. Writing and nondestructive reading is accomplished using word and bit conductors arranged completely external to the storage element formed by the two films. In both writing and nondestructive reading switching is by the high speed rotational switching.

The present invention relates to magnetic memory and more specifically to improved magnetic storage devices formed of coupled thin films of magnetic material.

Though most of the memories presently in commercial use employ ferrite cores as the primary storage medium, the increasing demands for higher memory speeds have focused attention on the development of storage devices fabricated of magnetic thin films. Thin film storage devices have been fabricated using a single film having uniaxial anisotropy, that is, an easy axis of magnetization parallel to which the magnetic moments in the film are oriented in the absence of a magnetic field. Such films store information by being caused to assume either a first stable state with the moments oriented in one direction along the easy axis, or a second stable state with the moments oriented in the opposite direction along the easy axis. These films can be operated at high speeds, since magnetization changes in the films can be effected by rotational switching, which is much faster than the predominate domain wall switching employed in other magnetic devices. However, due to the fact that single film storage devices are open flux path structures, many difficulties are encountered in the successful application of this type of storage devices. For example, the magnetization in the film in one direction produces a self demagnetizing field which tends to change the magnetization states. Further, stray fields are produced by the magnetization in the film which can affect other film storage devices in the immediate vicinity. There is also a tendency for a phenomenon termed "creep" to occur when thin film storage devices are repeatedly interrogated in a nondestructive mode. As a result of this "creep," repeated interrogations produce successive irreversible changes in the magnetization until the information stored is lost. In order to reduce the seriousness of these difficulties and the related consequences, coupled film storage devices have been developed in which a second film is placed adjacent to the first film to provide an essentially closed flux path type of structure. Examples of coupled film structures are described in U.S. Patents Nos. 3,015,807, issued Jan. 2, 1962, to A. V. Pohm et al.; 3,188,613, issued June 8, 1965 to G. A. Fedde, and in an article entitled "Coincident Current Nondestructive Readout from Thin Magnetic Films," by L. J. Oakland and T. D. Rosen, which appeared in the Journal of Applied Physics, vol. 30, No. 4, supp., pages 54S to 55S, April 1959.

The coupled film storage devices of the type to which the subject invention relates provide distinct advantages over previously developed devices in that the magnetization can be switched for either writing or nondestructive reading by rotational switching and, further, rotational reading and writing operations can be accomplished using conductors which are external to the coupled film storage devices. This latter type of geometry allows the use of drive and sense conductors which are relatively thick and, therefore, exhibit relatively low D.C. resistance. Coupled film structures previously developed either employed domain wall switching or required that there be at least one conductor placed between the coupled films. The use of a thick conductor between the film increases the space between the films and thereby the magnetic operation suffers. If a thinner conductor is used, the impendance problems are encountered.

As illustrated in the embodiments discussed herein, the advantages of the present invention are realized by using a pair of mangetic thin films arranged one above the other, with the easy axis of the films parallel to each other. The coupled films have two storage states, in one of which the magnetization in the first film is in a first direction and that in the second film in the opposite direction. In the second storage state, the magnetization in both films is reversed. The films are coupled by an interaction field so that each film applies to the other film, when in either storage state, a field which is in the same direction as the magnetization in the other film. One of the films is fabricated to have a greater uniaxial anisotropy field than the other film, the uniaxial anisotropy field being defined as the minimum field necessary to be applied in the hard direction perpendicular to the easy axis to orient the magnetization entirely in the hard direction. As a result of this difference in the anisotropy fields for the films, a field applied to the films solely in a direction perpendicular to the easy axis produces a rotation of the moments which is greater in one film than in the other. As a result, the coupling between the films changes during this rotation causing a field to be produced external to the films which can be sensed by a conductor external to the films. Upon termination of the applied field, the films reassume their original direction of magnetization, again by rotational switching. Writing is accomplished in these films by applying a digit field in the desired direction parallel to the easy axis jointly with a field perpendicular to the easy axis. As these fields are terminated, the magnetic moments in the film having the higher uniaxial anisotropy field rotate in the direction of the applied digit field. However, even in the presence of the digit field, the film having the lower uniaxial anisotropy is controlled by the field from the other film so that the moments therein are rotated to assume a stable state in a direction opposite to that of the applied digit field. All of the above operations can be accomplished using conductors external to the films, though it is possible, of course, to use a conventional sensing conductor arranged between the two films.

Thus, a primary object of the present invention is to provide an improved high speed magnetic storage device formed of coupled magnetic films.

Still another object of this invention is to provide an improved coupled film storage device which can be nondestructively interrogated at high speeds using rotational switching.

A further object of this invention is to provide a magnetic coupled film storage device in which writing operations can be accomplished using rotational switching.

Still it is another object of this invention to provide a coupled film storage device of this type which may be operated in either a word mode or a digit mode.

A further and significant object of this invention is to provide an improved coupled film storage device which can be nondestructively interrogated by rotational switching using conductors external to the coupled films.

The foregoing and other objects, features and advantages of the invention will be apparent from the following more particular description of preferred embodiments of the invention, as illustrated in the accompanying drawings.

Figures 1, 2, 3, 4:
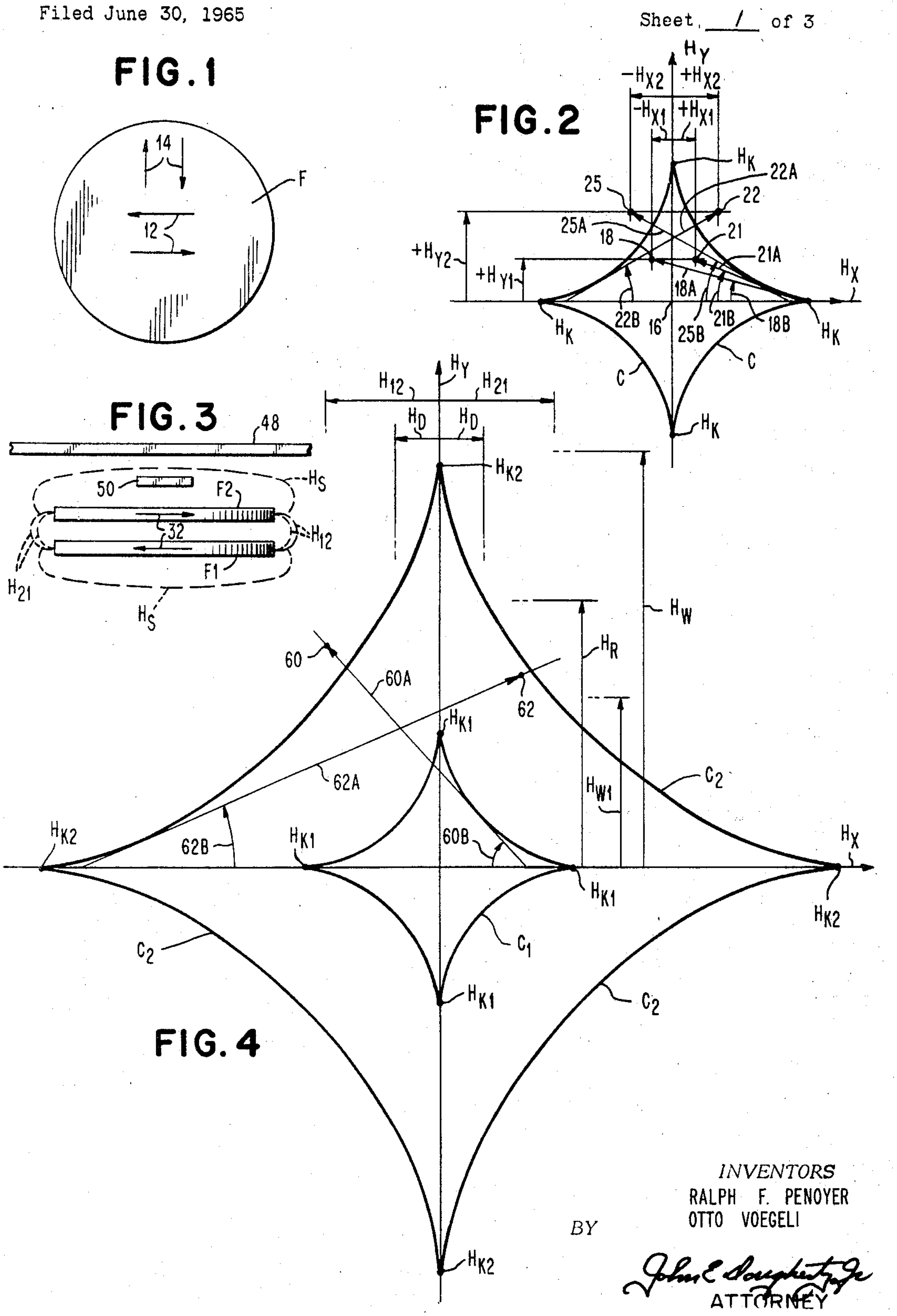
FIG. 1 is a schematic representation of a thin film of magnetic material.
FIG. 2 is a plot depicting the rotational switching characteristics of the film of FIG. 1.
FIG. 3 is a front view, partly schematic, of an embodiment of a coupled film storage device fabricated in accordance with the principles of the present invention.
FIG. 4 is a plot depicting the rotational switching characteristics of the storage devices of FIG. 3.

Referring now to FIG. 1, there is shown in schematic form a circularly shaped magnetic thin film element F. This element is made of a magnetic material such as Permalloy and is approximately 1000 angstroms thick. A film of this type is capable of acting essentially as a single domain wherein magnetization changes are effected by rotation of the magnetic moments rather than by domain wall switching. The element F is fabricated to have anisotropic magnetic properties, by which is meant it exhibits an easy axis and the magnetic moments in the plane of the film are oriented parallel to this axis in the absence of an applied field. The easy axis of the film element F is in the horizontal direction indicated by the arrows 12. The direction perpendicular to this direction is termed the hard axis of the film and is indicated by the arrows 14. Though the magnetic moments in such a film can be oriented along the hard axis, that is vertically in FIG. 1, by the application of an appropriate field, upon termination of the applied field, the moments realign themselves along the horizontal axis. Due to easy axis dispersion, some of the magnetization in an actual film remains locked close to the hard direction.

The magnetic rotational switching properties of the film element F are illustrated in the plot of FIG. 2 by the curve generally designated C. Magnetic fields applied in the horizontal or easy direction (arrows 12 in FIG. 1) are represented along the abscissa and fields applied in the hard axis direction (arrows 14 in FIG. 1) are represented along the ordinate. The points $H_K$ along the vertical and horizontal axes, where the portions of the curve C are tangent to these axes, represent the uniaxial anisotropy field for the film element. This is the minimum field effective of and by itself to produce an irreversible rotation of the magnetic moments. When the film is in a quiescent state with no field applied and the moments are oriented along the easy axis pointing either to the right or to the left, the state of the element is represented at 16, the intersection of the ordinate and abscissa in FIG. 2. If it is assumed that the film has its magnetization oriented to the right along the easy axis, then it is possible to change this orientation by applying to the film a field sufficient to exceed the threshold represented by the curve C. Consider, for example, a hard axis field in excess of the critical value shown at $H_K$, to be applied to the film. The magnetization moments are then oriented in the vertical direction, and upon termination of this field in the absence of any horizontal field, the moments may align themselves either to the right or to the left in the plane of the film. When a horizontal field is applied at the time the vertical field is removed, the moments realign themselves in the direction of the applied horizontal field.

When the applied fields are of insufficient intensity to exceed the threshold indicated by the curve C of FIG. 2, some reversible rotational switching takes place and the moments, upon termination of the applied fields, realign themselves in the original horizontal direction. More specifically, if the magnetic moments in the film are originally oriented along the easy axis in the negative or left direction in FIGS. 1 and 2, and a vertical field $+H_{Y1}$ and a horizontal field $-H_{X1}$ are simultaneously applied, the magnetic moments are rotated in a clockwise direction. The amount of rotation can be shown on the plot by drawing a line 18A from a field point 18, for applied fields $+H_{Y1}$ and $-H_{X1}$, tangent to the curve in the first quadrant of FIG. 2. The arrow adjacent field point 18 indicates the direction in which the moments are oriented parallel to the line. A detailed explanation of the manner in which such lines are drawn is included in an article by Hsu Chang, appearing in the IBM Journal of Research and Development, vol. 6, No. 4, pp. 419–429, October 1962. For the present case, with a field applied of $-H_{X1}$ and $+H_{Y1}$ to the film with the moments originally oriented in the left or negative direction, the vector is drawn parallel to the characteristic curve in the first quadrant indicating that the moments originally pointing to the left are now rotated by an angle 18B from the original horizontal direction. Since the point 18 defined by the applied fields is within the characteristic curve, upon termination of the applied fields, the magnetic moments reassume their initial orientation to the left along the horizontal axis.

The operation is similar if the horizontal field applied is in a direction opposite the initial direction of orientation along the easy axis as long as the field point defined by the vertical and horizontal field is within the characteristic curve. Thus, if along with the vertical field $+H_{Y1}$, a horizontal field $+H_{X1}$ in the opposite direction to the initial magnetization is applied to define a field point 21, the magnetic moments are rotated through an angle 21B to the direction indicated on a line 21A. However, when the fields are removed, the element reassumes its initial state with the moments oriented in the negative direction pointing to the left in the figures.

If the applied fields are such as to define a field point outside of the characteristic curve, rotational switching from one state to the other can be effected. A combination of a field in the horizontal direction $+H_{X2}$ and a field in the vertical direction $+H_{Y2}$, defining a field point 22 which is outside the curve C, is sufficient to produce an irreversible rotation. In this case, the state of the magnetization when the two fields are applied is obtained by drawing a line 22A from the point 22 tangent to a portion of the characteristic curve C in the second quadrant. This directional line indicates that in the presence of the applied fields, $+H_{X2}$ and $+H_{Y2}$ the moments are oriented to the right at an angle 22B to the horizontal axis. If now the applied fields are terminated, the moments align themselves along the easy axis in the plus direction, pointing to the right in the figures. The moments may be realigned back to the original direction by applying a field in the vertical direction $+H_{Y2}$ in combination with a field in the horizontal direction $-H_{X2}$. These combined fields represented at a point 25, rotate the moments to the direction indicated by the arrow on a line 25A at an angle 25B with the horizontal axis. Upon removal of these fields, the original magnetization in the negative direction along the easy axis is reassumed.

In the above description of the manner in which the moments are rotated by fields applied to the film element of FIG. 1, only a single film element is employed. Further, when the film element is in a stable or quiescent state with the moment oriented in one direction or the other no external field is applied to the films. In the case of storage devices of the type in which this invention is directed, two films are arranged, one above the other so that the magnetization in one produces a field which is applied to the other. This is illustrated in FIG. 3 wherein two films $F_1$ and $F_2$ are shown placed one above the other. These films are anisotropic and have their easy axes parallel to each other in the horizontal direction indicated by the arrows 32. The two films may, for example, be made of Permalloy and have substantially the same thickness, approximately 1000 angstroms. The primary difference between the two film elements $F_1$ and $F_2$ is that they are prepared such that one requires a larger field to produce irreversible rotational switching than the other. Stated another way, the film $F_1$ has a lower anisotropy field $H_{K1}$ than the anisotropy $H_{K2}$ for the upper film $F_2$. This is shown in FIG. 4 where the characteristic curve for the film $F_1$ is represented at $C_1$ and the characteristic curve for the upper film $F_2$ is represented at $C_2$. The anisotropy field for the films $H_{K1}$ and $H_{K2}$ are located at the points at which the curves are tangent to the ordinate and abscissa.

Because of the arrangement of the two films, it can be seen that the stray field from each of the films is present as a field applied to the other film. These fields are represented in FIGS. 3 and 4 at $H_{12}$ by the field lines $H_{12}$ and $H_{21}$ for the case when the magnetic moments in the lower film $F_1$ are oriented to the left in the negative direction and the magnetic moments in the upper film $F_2$ are oriented to the right in the positive direction. Referring to FIG. 4, it can be seen therefore, that the film $F_2$ having its moments oriented in the positive direction along the easy axis has applied to it the stray field $H_{21}$ of film $F_1$. Similarly, the lower film $F_1$ with its magnetic moments oriented to the left, and in the negative direction, is subjected to the stray field $H_{12}$ of the upper film $F_2$. With films $F_1$ and $F_2$ in close proximity, these stray fields are essentially equal to and oppositely directed to the demagnetizing fields and the result is an essential reduction of the demagnetizing field to zero.

The films $F_1$ and $F_2$ are arranged to be tightly coupled so that essentially all of the stray flux from one passes through the other, when in the quiescent state shown in FIG. 3. The same is true, of course, when the moments are rotated in both films so that the orientation in the lower film is positive and to the right and in the upper film negative and to the left. However, because of the difference in the uniaxial anisotropy fields for the films, the moments are rotated different amounts by externally applied fields. When, for example, a drive conductor 48 is energized to apply a vertical field to both films, the rotation is not the same in both films, and therefore, the magnetization components both in a vertical and horizontal direction are different. During this rotation, the tight coupling between the films is disrupted and stray fields are created which close in the space outside the films as indicated by the dotted flux lines $H_S$. This change can be sensed by a conductor such as 50 to produce an output indicative of the state of the two films.

Figure 5:
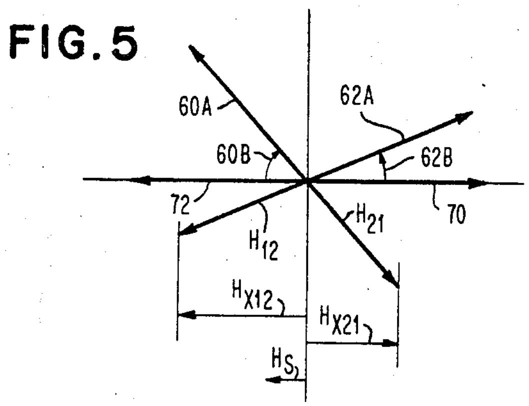
FIG. 5 is a plot depicting the manner in which the magnetization is rotated and the fields of the two films interact when the storage device of FIG. 3 is operated in a nondestructive mode.
Figure 6A:
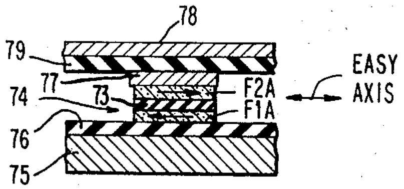
FIG. 6A is a cross section of the structure shown in FIG. 6.

The manner in which the storage device of FIG. 3 is operated in accordance with the principles of the present invention can be understood by consideration of this figure, along with FIGS. 4 and 5. The storage element is considered to be storing a binary "1" when the moments are aligned as shown in FIG. 3, that is, with the moments in the upper film $F_2$ aligned in the positive direction and the moments in the lower film $F_1$ aligned in the negative direction. A binary "0" is stored when the magnetization in both films is reversed. In either case, when the device is in a quiescent stable state, the flux produced by the magnetization of each film closes through the other film with substantially no leakage flux in the space surrounding the device.

Energization of conductor 48 to read out the stored information causes a vertical hard axis field $H_R$ to be applied to both films. When this field is applied, the film $F_2$ is also being subjected to a horizontal field $H_{21}$ from film $F_1$ and similarly, the film $F_1$ is subject to a horizontal field $H_{12}$ from film $F_2$.

The applied hard axis read field $H_R$ causes the moments in both films to rotate towards the upward vertical direction. Both films are subjected to the same externally applied field but because of the lower uniaxial anisotropy characteristics of film $F_1$, the moments in this film are rotated through a larger angle than are the moments in film $F_2$. Thus, during the rotation, the horizontal component of the field applied by each film to the other film decreases from the initial equal values $H_{12}$ and $H_{21}$ and since the moments in film $F_1$ are rotated through a greater angle from the horizontal, the horizontal component of the field applied by the film $F_1$ to the film $F_2$ decreases to a smaller value than the oppositely directed horizontal component of the field applied by film $F_2$ to film $F_1$. At the same time, the rotation of the moments in both films away from the horizontal axis causes the field applied by each film to the other film to include a vertical component which is in a direction opposite to the direction of the applied field $H_R$. The vertical component of the field applied by film $F_1$ to film $F_2$ is greater than the vertical component of the field applied by film $F_2$ to film $F_1$ due to the greater angular rotation of the moments in film $F_1$. As a result the orientation of the moments in the film $F_1$ is, as is depicted, on a line 60A drawn from a field point 60 to curve $C_1$ in FIG. 4, and the orientation of the moments in film $F_2$ is as shown on a line 62 drawn from a field point 62A tangent to curve $C_2$. The angle through which the moments in film $F_1$ are rotated is shown at 60B and is, as stated above, greater than the angle through which the moments in film $F_2$ are rotated, which is shown at 62B.

This rotation is shown in FIG. 5 wherein magnetization in the horizontal direction parallel to the easy axis is plotted along the abscissa and magnetization in the hard direction along the ordinate. The initial magnetization of the film element $F_2$ is indicated in FIG. 5 by arrow 70 extending along the horizontal axis to the right and the initial magnetization of the film $F_1$ is represented by an arrow 72 extending to the left. When the vertical field $H_R$ is applied as described above by energizing conductor 48, the moments in film $F_2$ are rotated through the angle 62B to the direction indicated on line 62A. The moments in film $F_1$ are rotated through the larger angle 60B to the direction indicated on line 60A. The magnetization in film $F_2$ applies a field $H_{12}$ in the opposite direction to film $F_1$. Similarly, the magnetic field applied to film $F_2$ as a result of the magnetization of film $F_1$ is represented by the vector $H_{21}$. The horizontal component of the stray field $H_{21}$ of the film $F_1$ is shown at $H_{X21}$ and the horizontal component of the stray field $H_{12}$ is shown at $H_{X12}$. The difference between these two horizontal components is designated at $H_S$ in the drawing, and this represents the field which does not close through the two films, but in the space around the films as indicated in FIG. 3. About half of this flux surrounds conductor 50. It is evident from the above description that as the moments are rotated in the two films as a result of the field applied in the vertical direction, the tight coupling between the elements is disrupted and a magnetic field is produced which links the conductor 50 and produces an output. The polarity of this output is indicative of the direction in which the moments were aligned along the horizontal axis prior to the application of the interrogation signal to conductor 48. When this signal is terminated and, therefore, the field $H_R$ is removed, the horizontal field applied by each film to the other film causes both to reassume their initial condition in the binary "1" state.

It should be noted that the field $H_R$ applied to achieve the nondestructive readout described above is greater than the anisotropy field $H_{K1}$ for film 1. However, the readout is nondestructive, since the stray fields serve to reset each film in its original condition when the vertically applied field $H_R$ is removed. The readout field may have an intensity less than the value $H_R$ and may, in fact, be less than the field $H_{K1}$, in which case, a lesser rotation is produced in each film. In such a case, however, the output is not as large as that produced when a field of the intensity $H_R$ is applied, since the difference in rotation is not as great. A field in excess of the field $H_R$ may also be applied even to the point that the anisotropy field $H_{K2}$ for film $C_2$ is exceeded. Though in a normal case the application of such a field would destroy the information stored in a thin film element, here where each film is continually subjected to a horizontal component of the stray field of the other, the moments are not aligned completely vertically along the hard axis. As a result, the films reassume their initial condition storing a binary "1" on termination of the applied field. When a field having an intensity greater than $H_{K2}$ is applied, though each film undergoes a larger rotation than when a field $H_R$ is applied, the difference in rotation is not as great. Therefore, the application of larger readout field does not necessarily produce a larger output signal on conductor 50.

When the storage element of FIG. 3 is storing a binary "0" with the magnetization in each of the films reversed, the operation is essentially the same. The interrogation or readout signal applied to conductor 48 rotates the moments in each film a different amount, thereby producing a field which links output conductor 50. In this case, the polarity is opposite to that achieved before, when a binary "1" is stored. In both cases, as the vertical field is removed, a subsequent pulse of opposite polarity is produced as the flux linkage around conductor 50 is reduced. Thus, it is the polarity of the initial output produced as the interrogation signal is applied which indicates the binary state of the storage device.

Writing is accomplished in the storage device of FIG. 3 by energizing conductor 48 with a pulse of sufficient magnitude to produce a word field $H_W$ (FIG. 4) which is applied to both films $F_1$ and $F_2$. If a binary "1" is to be written, conductor 50 is energized at the same time with a pulse in a direction and magnitude to apply to both films a digit field $+H_D$ in FIG. 4. Upon the application of these fields, the moments in both films are oriented in almost a vertical direction, the rotation being sufficient to reduce the horizontal component in each film to a point where the net horizontal field applied is in the positive direction of digit field $+H_D$. The pulse applied to conductor 48 is then terminated, thereby removing field $H_W$. Initially, both films in the presence of the horizontal field $H_D$ tend to orient themselves in the positive direction. However, as the rotation in the film $F_2$, the one having the larger anisotropy field $H_{K2}$ takes place, the horizontal component of this magnetization increases. This produces a growing stray field in the horizontal direction, which is applied to film $F_1$ and which becomes larger than the applied digit field $H_D$ so that the moments in the film $F_1$ are rotated counterclockwise in FIG. 4. Thus, even in the presence of the applied field $+H_D$ in the positive direction, upon removal of the write field, $H_W$, film $F_1$ assumes a stable state with the moments oriented along the easy axis in the negative direction, as a result of the overriding influence of the horizontal stray field from film $F_2$. Film $F_2$, of course, is oriented in the plus direction so that the binary "1" state shown in FIG. 3 is achieved. When a binary "0" is to be written, the operation is essentially the same, with the exception that the digit field in this case, applied by energizing conductor 50 is in the negative direction represented by $-H_D$ in FIG. 4. It should be emphasized that during a writing operation when the hard axis word field $H_W$ is applied, though both films have their moments initially oriented in the same direction by the digit field ($-H_D$ or $+H_D$), the rotational interaction is such when the field $H_W$ is removed that the film $F_2$ having the high anisotropy field $H_{K2}$ rotates to a final stable state in the direction of this applied digit field and film $F_1$ rotates to a stable state in the opposite direction. The operation is not a two-step operation of the type in which both films first assume a condition with the moments oriented in the same direction along the easy axis, and when the write field $H_W$ is removed and the film $F_1$ is switched by domain wall switching as a result of the stray field from film $F_2$ when the digit field is removed.

It is not necessary that the writing field $H_W$ exceed the value $H_{K2}$, as long as it, together with the digit field, is sufficient to exceed the threshold for film $F_2$ represented by curve $C_2$. Further, the horizontal or digit field ($+H_D$ or $-H_D$) need not be maintained until rotation back to the easy axis direction is completed in both films, but this field may be terminated along with the write field. A write operation may also be achieved during which the fields $H_W$ and $+H_D$ or $-H_D$ are applied as above and the write field is not removed in one step. In such a case, the energization of the conductor 48 is controlled so that the write field is first reduced, for example, to a value $H_{W1}$ at which time the digit field $+H_D$ or $-H_D$ is terminated and the then vertical field is reduced to "0."

The size of the output pulse realized during the now destructive readout operation previously described is dependent not only upon the intensity of the read field $H_K$ but on a number of the parameters. In the embodiment of FIG. 3, the film has a uniaxial anisotropy field three times as large as that of film $F_1$. The ratio between these two values, termed the anisotropy ratio A, is three. Larger nondestructive readout signals can be obtained by increasing the ratio, for example, by substituting for the film $F_2$, a film having a larger anisotropy field. When a higher anisotropy field film is substituted for film $F_2$ to obtain a larger output signal output, larger write signals must, of course, be applied during write operations to store information in the device.

Figure 6:
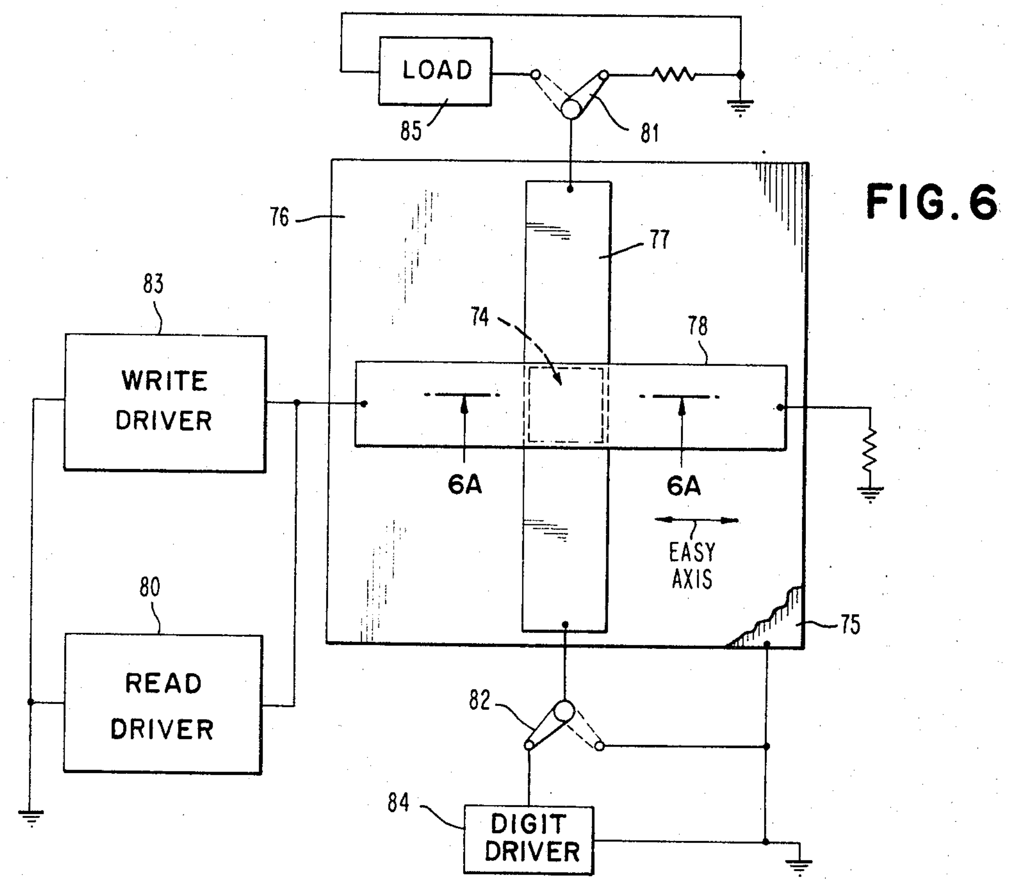
FIG. 6 shows in more detail an embodiment of a coupled film storage device together with the associated circuitry necessary for its operation.

A further embodiment of the invention is shown in FIG. 6, wherein a magnetic thin film storage element generally designated 74 is shown with the associated read and write circuitry necessary for its operation. As is indicated in the cross-sectional view of FIG. 6, storage element 74 is formed of two film elements $F_{1A}$ and $F_{2A}$ arranged one above the other and separated by a layer of insulating material 73. These films have different uniaxial anisotropy fields $H_K$, the upper film $F_{2A}$ having an anisotropy field essentially three times that of the lower film $F_{1A}$. As shown in FIG. 6, the storage device is mounted on a ground plane 75 separated from the lower film $F_{2A}$ by a layer of insulating material 76. A vertically extending conductor 77 serves as both a sense conductor and a digit driver. A horizontally extending conductor 78 is the word driver and is separated from conductor 77 by a layer of insulating material 79. The film elements $F_{1A}$ and $F_{2A}$ in FIG. 6 are rectangular in form and in this specific, differ from those shown in FIG. 3. However, this change in geometry, though it does affect the overall magnetic characteristics in some degree, does not alter the basic and underlying principles of operation of the invention.

In the operation of the storage device of FIG. 6, nondestructive readout operations are achieved by controlling a read driver 80 to apply signals to conductor 78 which cause outputs to be induced on conductor 77 indicative of the storage state of the device. During a read operation, a pair of switches 81 and 82 are transferred to the dotted position shown in the figure and the output is directed to a load 85. During a write operation, a write driver 83 applies a signal to word conductor 78 and a bit driver 84 applies a signal to conductor 78. During this operation, the switches 81 and 82 are in the full line portion shown in the drawing.

Figure 7:
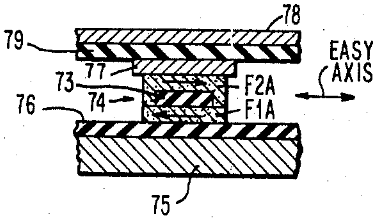
FIG. 7 is a cross sectional view showing another embodiment of the invention wherein the coupled films form a closed flux path.

FIG. 7 is a cross sectional view showing a further embodiment of the invention, which is similar to that of FIG. 6 in all respects but one, this being that the two film elements $F_{2A}$ and $F_{1A}$ are so fabricated that a completely closed magnetic flux path is provided. This type of structure is fabricated for example, by evaporation using masks such that the layer of insulating material separating the two magnetic film elements is narrower than these elements so that when the second film element $F_{2A}$ is evaporated, it contacts the lower film element $F_{1A}$ to provide the desired closed flux path. In the cross sectional view of FIG. 7, the magnetic connections between the films are exaggerated for illustrative purposes.

Figure 8:
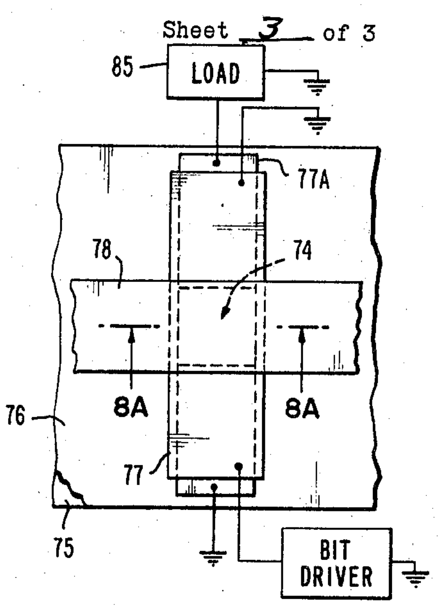
FIG. 8 illustrates a further embodiment of a coupled film storage device with drive conductors arranged external to the films and a sense conductor between the films.
Figure 8A:
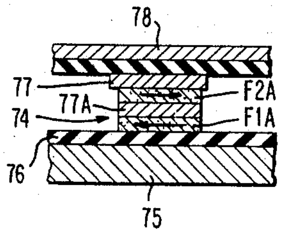
FIG. 8A is a cross sectional view of the structure of FIG. 8.

A further embodiment is shown in FIGS. 8 and 8A which is similar to the embodiment of FIG. 6 and differs primarily in that a separate sense conductor 77A is provided between the two films $F_{1A}$ and $F_{2A}$. The word driver 78 and bit driver 77 are arranged as before, external to the two films and these drivers are operated in the same manner as above, to apply the fields necessary to read and write. With the sense conductor 78A arranged between the two films, a larger output signal is produced upon switching during a nondestructive readout, since this conductor links the closed flux path formed by both films.

Figure 9:
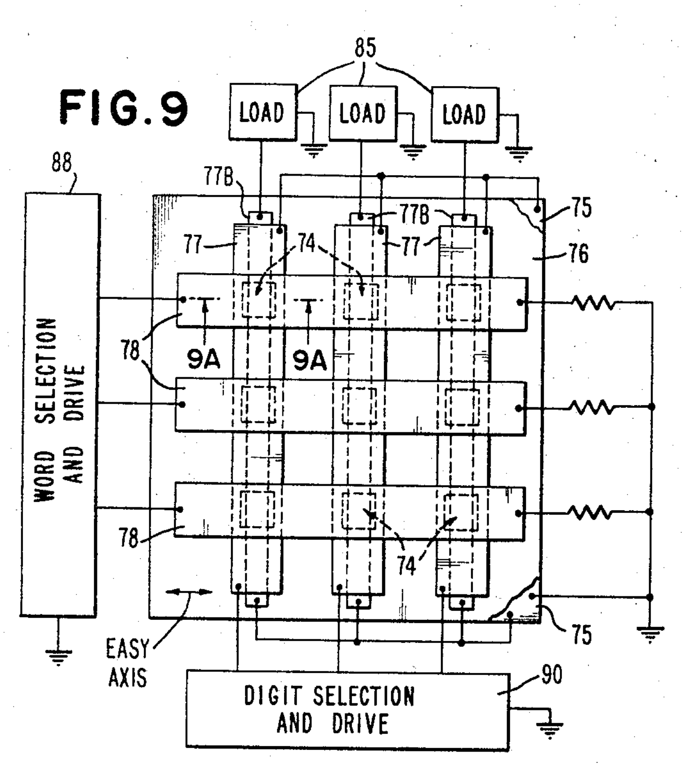
FIG. 9 is a schematic representation of a memory array of storage devices constructed in accordance with the principles of the present invention.
Figure 9A:
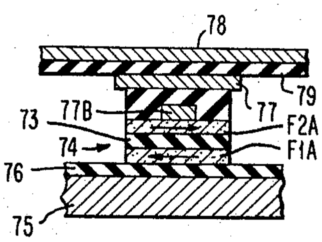
FIG. 9A is a cross sectional view of a storage device used in the memory array of FIG. 9.

A further embodiment is shown in FIG. 9 in the form of an array of magnetic storage elements constructed in accordance with the principles of this invention. In this figure, the storage elements 74 are arranged in columns and rows in a conventional manner. The word drive lines are energized by word selection circuitry generally designated 88 and the bit drive lines 78 are energized by digit selection circuitry generally designated 90. In the embodiment of FIG. 9, as is shown in detail in the cross sectional view of FIG. 9A, each storage element is provided with a separate sense line 77B which is somewhat narrower than the bit driver 78 and is arranged between the bit driver and the two storage films $F_{1A}$ and $F_{2A}$. The operation is the same as that described above. The sense conductor 78B produces an output during a nondestructive read operation when a read pulse is applied to a word conductor 77. Again, all of the switching for this nondestructive read operation is by rotation and, therefore, at very high speeds. Further, the nondestructive read operation is achieved with the films returning by rotation to their original states directly.

Writing may be accomplished in the magnetic memory array of FIG. 9 in either a digit mode or a word mode. Thus, for example, if the upper horizontal drive line 78 is energized to apply a hard axis write field to the three storage devices 74 in the upper row of the memory, the interacting fields between the coupled films, return the films to their original condition upon termination of the applied field even though it exceeds the uniaxial anisotropy field for both films. Writing of new information takes place only in those storage devices in the upper row which has its associated digit drive conductor 77 energized by the digit selection and drive circuit represented at 90.

It is apparent from the embodiments described above that improved coupled film storage devices are provided which can be operated in a thin film form at high speeds by rotational switching, using drive and sense conductors which are external to the coupled films. With this type of device it is possible to use fairly thick drive and sense conductors, and, therefore, conductors having relatively low resistivity without in any way affecting the coupling between the two films forming the storage element. Where one or more of the drive lines is placed between the film it is obvious that if the conductor is made thick to achieve a lower resistivity the separation between the films is also increased. Close coupling is therefore only possible at the expense of the resistivity of the conductor separating the film. In the embodiment of FIG. 8A, both the digit and word drive conductors are external to the coupled films and it is only the sense conductor 77A which is located between the films. Further, the device may be operated using only two conductors, a word conductor which is energized for both reading and writing and a bit conductor which is energized during writing and serves as a sense conductor during reading operations. Extremely fast nondestructive interrogating operations involving rotational switching only are achieved since the only drive field applied for interrogation is in a direction transverse to the easy axis of both films.

While the invention has been particularly shown and described with reference to preferred embodiments thereof, it will be understood by those skilled in the art that various changes in form and details may be made therein without departing from the spirit and scope of the invention.

What is claimed is:

1. A magnetic memory comprising:

(a) a coupled film storage element including first and second anisotropic magnetic thin films arranged adjacent each other in spaced parallel planes;

(b) said first thin film having a first easy axis and when storing information being magnetized with the magnetic moments therein aligned in one direction parallel to said first easy axis;

(c) said second thin film having a second easy axis parallel to said first easy axis and when storing information being magnetized with the magnetic moments therein aligned parallel to said second easy axis in a direction opposite to the direction of magnetization in said first film;

(d) the magnetization in said first thin film in said first direction applying to said adjacent second thin film a magnetic field in said opposite direction along said second easy axis;

(e) the magnetization in said second thin film in said second direction applying to said adjacent first thin film a magnetic field in said one direction parallel to said first easy axis;

(f) said first thin film having a first uniaxial anisotropy field;

(g) said second thin film having a second uniaxial anisotropy field greater than said first uniaxial anisotropy field of said first thin film;

(h) word conductor means and bit conductor means each arranged adjacent to and entirely external to said coupled film storage element formed by said first and second films;

(i) energizing means connected to said word conductor means and said bit conductor means for writing information in said coupled film storage element by energizing said word conductor means and said bit conductor means each of which is entirely external to said coupled film storage element, and for nondestructively interrogating said thin film storage element by energizing only said word conductor means which is entirely external to said coupled film storage element;

(j) said bit conductor means extending in a direction perpendicular to said first and second easy axes;

(k) said word conductor means extending in a direction parallel to said first and second easy axes and when energized together with said bit conductor means to write information or when energized alone during a nondestructive read operation, applying to both said first and second films a field in a direction perpendicular to the easy axis of the films.

2. The memory of claim 1 including output sense means connected to said bit conductor means.

3. The memory of claim 1 wherein said uniaxial anisotropy field of said second film is at least twice said uniaxial anisotropy field of said first film.

4. The memory of claim 1 wherein said magnetic field applied perpendicular to said easy axes by said word conductor means when energized to nondestructively interrogate said storage element exceeds the uniaxial anisotropy field for said first film and is less than the uniaxial anisotropy field for said second film.

References Cited

UNITED STATES PATENTS

| | | | |
|---|---|---|---|
| 3,188,613 | 6/1965 | Fedde | 340—174 |
| 3,302,190 | 1/1967 | Boylan et al. | 340—174 |
| 3,252,152 | 5/1966 | Davis et al. | 340—174 |

STANLEY M. URYNOWICZ, *Primary Examiner.*